（12) United States Patent
Mu et al.

(10) Patent No.: US 12,413,869 B2
(45) Date of Patent: Sep. 9, 2025

(54) LOW-POWER ALWAYS-ON EVENT-BASED VISION SENSOR

(71) Applicant: OMNIVISION TECHNOLOGIES, INC., Santa Clara, CA (US)

(72) Inventors: Bo Mu, San Jose, CA (US); Luis Eduardo García Capel, Singapore (SG); Menghan Guo, Shanghai (CN)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 96 days.

(21) Appl. No.: 18/399,313

(22) Filed: Dec. 28, 2023

(65) Prior Publication Data

US 2025/0220317 A1     Jul. 3, 2025

(51) Int. Cl.
*H04N 25/47*     (2023.01)
*H04N 25/42*     (2023.01)
*H04N 25/702*    (2023.01)
*H04N 25/709*    (2023.01)

(52) U.S. Cl.
CPC ............. *H04N 25/47* (2023.01); *H04N 25/42* (2023.01); *H04N 25/702* (2023.01); *H04N 25/709* (2023.01)

(58) Field of Classification Search
CPC ...... H04N 25/47; H04N 25/709; H04N 25/42; H04N 25/702
USPC ........................................................ 348/308
See application file for complete search history.

(56) References Cited

U.S. PATENT DOCUMENTS

| | | | |
|---|---|---|---|
| 10,353,650 B2 | 7/2019 | Tsukada | |
| 11,563,909 B1* | 1/2023 | Chen | H04N 25/75 |
| 11,831,981 B2* | 11/2023 | Nistico | H04N 25/707 |
| 11,895,398 B2* | 2/2024 | Nakagawa | H04N 23/667 |
| 12,003,870 B2* | 6/2024 | Mostafalu | H04N 25/77 |
| 12,075,175 B1* | 8/2024 | Berkovich | H04N 25/75 |
| 12,108,141 B2* | 10/2024 | Berkovich | H04N 23/11 |
| 12,184,973 B2* | 12/2024 | Yang | H04N 25/707 |
| 2018/0143701 A1* | 5/2018 | Suh | H04N 25/709 |
| 2018/0307445 A1* | 10/2018 | Tsukada | G06F 3/1238 |
| 2021/0377453 A1 | 12/2021 | Nistico | |
| 2022/0166925 A1* | 5/2022 | Nakagawa | B60R 1/00 |
| 2023/0300282 A1* | 9/2023 | Seo | H04N 25/00 348/294 |
| 2023/0336881 A1* | 10/2023 | Mostafalu | H04N 25/46 |
| 2023/0403482 A1* | 12/2023 | Miyazaki | H04N 25/703 |
| 2024/0048859 A1* | 2/2024 | Chen | H04N 25/707 |
| 2024/0205561 A1* | 6/2024 | Son | H04N 25/47 |

(Continued)

*Primary Examiner* — Pritham D Prabhakher
(74) *Attorney, Agent, or Firm* — MUNCY, GEISSLER, OLDS & LOWE, P.C.

(57) ABSTRACT

An event-based vision sensor is provided. The event-based vision sensor comprises an event-based vision sensor pixel array, an always-on row scanner, an always-on column scanner, a major row scanner and a major column scanner. The event-based vision sensor pixel array comprises a plurality of always-on pixels and a plurality of major pixels. The always-on row scanner and the always-on column scanner are for the plurality of always-on pixels. The major row scanner and the major column scanner are for the plurality of major pixels. When the event-based vision sensor is configured to be operated in an always-on mode, the plurality of major pixels are powered down, and the plurality of always-on pixels, the always-on row scanner and the always-on column scanner are in operation.

20 Claims, 4 Drawing Sheets

(56) References Cited

U.S. PATENT DOCUMENTS

| | | | |
|---|---|---|---|
| 2024/0406588 A1* | 12/2024 | Feng | H04N 25/47 |
| 2025/0119659 A1* | 4/2025 | Suess | H04N 25/683 |
| 2025/0119660 A1* | 4/2025 | Suess | H04N 25/68 |

* cited by examiner

LOW-POWER ALWAYS-ON EVENT-BASED VISION SENSOR

BACKGROUND OF THE INVENTION

1. Field of the Invention

The present disclosure relates to an event-based sensor, and more particularly, to a low-power always-on event-based sensor for mobile applications.

2. Description of the Related Art

Image sensors face challenges in power consumption. Semiconductor circuits consume power even when on standby, but always-on image sensors have dynamic power control. This feature allows them to optimize power consumption based on the required image capturing and data processing, depending on the system load. This addresses the need for efficient power usage in image sensors, ensuring optimal performance while minimizing energy consumption.

SUMMARY OF THE INVENTION

One aspect of the present disclosure provides an event-based vision sensor. The event-based vision sensor comprises an event-based vision sensor pixel array, an always-on row scanner, an always-on column scanner, a major row scanner and a major column scanner. The event-based vision sensor pixel array comprises a plurality of always-on pixels and a plurality of major pixels. The always-on row scanner and the always-on column scanner are for the plurality of always-on pixels. The major row scanner and the major column scanner are for the plurality of major pixels. When the event-based vision sensor is configured to be operated in an always-on mode, the plurality of major pixels are powered down, and the plurality of always-on pixels, the always-on row scanner and the always-on column scanner are in operation.

Another aspect of the present disclosure provides an image sensing apparatus. The image sensing apparatus comprises: a hybrid pixel array, an always-on row scanner, an always-on column scanner, a CMOS image sensor (CIS) row scanner, a CIS column scanner. The hybrid pixel array comprises a plurality of always-on event-based vision sensor pixels and a plurality of CIS pixels. The always-on row scanner and the always-on column scanner are for the plurality of always-on pixels. The CIS row scanner and The CIS column scanner are for the plurality of CIS pixels. When the image sensing apparatus is configured to be operated in an always-on mode, the plurality of CIS pixels are powered down, and the plurality of always-on event-based vision sensor pixels the always-on row scanner and the always-on column scanner are in operation.

Another aspect of the present disclosure provides a method for operating an event-based vision sensor. The event-based vision sensor comprises an event-based vision sensor pixel array. The event-based vision sensor pixel array comprises a plurality of always-on pixels and a plurality of major pixels. The method comprises: when the event-based vision sensor is in an always-on mode: receiving, by a signal processor, first events detected by the plurality of always-on pixels; determining, by the signal processor, whether the received first events meet a first predefined threshold; and in response to determining the received first events meet the first predefined threshold, generating, by the signal processor, a valid trigger signal to turn on at least part of the plurality of major pixels and switching the event-based vision sensor to be in an activity mode.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, dimensions of the various features may be arbitrarily increased or reduced for clarity of discussion.

DETAILED DESCRIPTION OF THE DISCLOSURE

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from normal deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Always-on (AO) is a cutting-edge sensing technology designed for mobile devices. It enables devices to be context-aware, meaning they can recognize and understand the environment or any changes happening around them. Such contextual awareness allows for the creation of an autonomous user interface (UI) that adapts based on the information derived from sensing.

One of the key advantages of AO technology is its power efficiency. It utilizes power-efficient co-processors that offload work from the device's main processor, thereby reducing its workload and extending the battery life. By offloading tasks to these specialized co-processors, the device can conserve energy and operate for longer periods without requiring frequent recharging.

Overall, AO technology revolutionizes the way mobile devices interact with their surroundings. It empowers devices to gather and interpret data from their environment, enabling them to provide users with a more personalized and intuitive experience. Additionally, the power-efficient co-processors ensure that these devices can operate for extended periods without draining the battery, making them more reliable and convenient for users on the go.

Always-on (AO) technology has a wide range of applications that enhance the functionality and user experience of mobile devices. One of the key applications is the ability to use gestures or voice commands to launch applications. With AO technology, users can simply wave their hand or speak a command to open their favorite apps, eliminating the need to manually navigate through menus or search for icons.

Another valuable application of AO technology is its capability to analyze the environment and adjust settings accordingly. For example, in dimly lit environments, AO technology can automatically decrease the screen brightness to ensure optimal visibility while conserving battery life. This feature not only enhances user comfort but also contributes to energy efficiency.

AO technology also enables real-time monitoring of an individual's health, fitness, and well-being. By utilizing sensors and data analysis algorithms, mobile devices can continuously track vital signs, physical activities, and sleep patterns. This information can be used to provide personalized health recommendations, track progress towards fitness goals, and even detect potential health issues. With AO technology, users can have a comprehensive understanding of their well-being and make informed decisions to improve their overall health.

In addition to these applications, AO technology has the potential to revolutionize various industries. For example, in the automotive sector, AO can enable hands-free control of in-car systems, allowing drivers to focus on the road while still accessing essential features. In the retail industry, AO technology can provide personalized shopping experiences by analyzing customer preferences and offering tailored recommendations.

Accordingly, the applications of AO technology are vast and diverse. From enhancing user interaction to improving health monitoring and revolutionizing industries, AO technology has the potential to transform the way we use and interact with mobile devices, making them more intuitive, efficient, and personalized.

Semiconductor circuits are known to consume power even when they are on standby, which can lead to unnecessary energy wastage. However, the AO image sensor offers a solution to this issue. With its dynamic power control feature, the AO image sensor can optimize power consumption based on the specific requirements of image capturing and data processing. This means that the AO image sensor adjusts its power usage according to the system load, ensuring that only the necessary amount of power is consumed. By doing so, the AO image sensor effectively minimizes energy consumption and reduces unnecessary power usage. This not only helps to conserve energy but also contributes to a more sustainable and efficient operation of electronic devices.

Using AO technology can automatically activate a device by detecting when the user is looking at the screen, even when the device is in sleep mode. This eliminates the stress of constantly tapping the screen to keep it on. With AO technology, users can effortlessly interact with their devices without worrying about the screen turning off unexpectedly. This innovative feature not only enhances user experience but also conserves battery life by only activating the screen when necessary. Whether it's reading an article, watching a video, or simply checking notifications, AO technology ensures a seamless and convenient user experience.

The technology described herein is designed to optimize battery life by activating the main processor only briefly for user identification purposes. By doing so, the device can conserve energy and extend its battery life. Additionally, this technology offers the flexibility to configure the device to automatically switch to the standby screen when the user is no longer detected. This feature further enhances battery efficiency by minimizing unnecessary power consumption during periods of user inactivity. This innovative technology aims to provide users with a longer-lasting battery life while maintaining a seamless user experience.

Algorithm integration into mobile/IoT devices poses significant challenges due to the limitations of battery life and power. These devices are typically designed to be energy-efficient, and running complex algorithms such as face detection or recognition and object detection or recognition can drain the battery quickly. Therefore, it is crucial to develop algorithms that are optimized for low power consumption.

Another challenge is the limitations of the sensors used in these devices. Sensors may have limitations in terms of sensitivity, selectivity, resolution, accuracy, and precision. These limitations can affect the performance of the algorithms, as they rely on accurate and precise sensor data for accurate results. Therefore, it is important to consider these limitations and develop algorithms that can work effectively with the available sensor capabilities.

Furthermore, the data collected by these sensors needs to be decoded and processed before it can be analyzed. This decoding and processing step adds an additional computational burden on the device, which can further drain the battery. Therefore, it is essential to develop efficient algorithms that can handle this data processing step in a timely manner.

Lastly, real-time analysis of the data is crucial for providing timely feedback. However, the limited computational resources and processing power of mobile/IoT devices can make real-time analysis challenging. Therefore, it is necessary to develop algorithms that can analyze the data quickly and provide feedback in real time, without compromising the device's performance or battery life.

CMOS image sensor always-on devices often face several limitations that hinder their performance. One of the major drawbacks is the response latency, which requires at least two frames at a rate of 3-5 frames per second. Such delay in capturing and processing images can affect the real-time functionality of the device.

Another limitation is the presence of data redundancy in static areas. This means that the sensor may capture and store unnecessary data in regions that do not change over time. This redundancy not only consumes storage space but also increases the processing time required to analyze the captured images.

Furthermore, always-on devices using CMOS image sensors often suffer from low temporal resolution. This means that the sensor may not be able to capture fast-moving objects or events accurately. The resulting images may lack the necessary details and appear blurry or distorted.

Additionally, these sensors tend to have a low dynamic range, which refers to their ability to capture a wide range of light intensities. This limitation can result in overexposed or underexposed areas in the captured images, leading to a loss of important details.

Lastly, CMOS image sensors are prone to image blur, especially in situations where there is motion or shaking. This can be a significant drawback for always-on devices that require clear and sharp images.

In summary, the limitations of image CMOS image sensors in always-on devices include response latency, data redundancy in static areas, low temporal resolution, low dynamic range, and susceptibility to image blur and distortion in rolling shutter sensors. These limitations need to be addressed to enhance the performance and functionality of such devices.

Event-based vision sensors (EVS) offer a unique solution for always-on applications due to their specific characteristics. Unlike traditional sensors, EVS only generate data when there are changes in luminance or motion detected. Such feature allows for efficient data generation and utilization in various applications.

One of the key advantages of EVS is its fast response time coupled with high power efficiency. Compared to traditional sensors operating at 5 frames per second (fps) with a power consumption of 10 milliwatts (mW), EVS operates at less than 1 mw, resulting in significant power savings.

Another advantage of EVS is the absence of redundant data generation. Unlike conventional sensors that capture and store continuous frames, EVS only generates data when there are relevant changes in the scene. This eliminates the need for a buffer to store previous data, such as in CMOS image sensor frames, reducing storage requirements and processing time.

EVS also offers high temporal resolution, allowing for the accurate capture of fast-moving objects or events. Such feature ensures that important details are not missed and enables real-time analysis and response.

Furthermore, EVS eliminates motion blur, a common issue in traditional sensors. By capturing data only when there are changes in luminance or motion, EVS produces clear and sharp images free of distortion, even in dynamic scenes.

EVS also provides a high dynamic range, allowing for the capture of a wide range of light intensities. This ensures that both bright and dark areas in the scene are accurately represented, preserving important details.

Additionally, EVS can be coupled with CIS in a hybrid sensor, combining the advantages of both technologies. Such hybrid approach allows for even greater flexibility and performance in various applications.

Therefore, EVS offers several advantages for always-on applications. These include fast response with high power efficiency, no redundant data generation, high temporal resolution, absence of motion blur, high-dynamic range, and the ability to be coupled with CIS in a hybrid sensor. These advantages make EVS a suitable choice for enhancing the performance and functionality of always-on devices.

Figure 1:
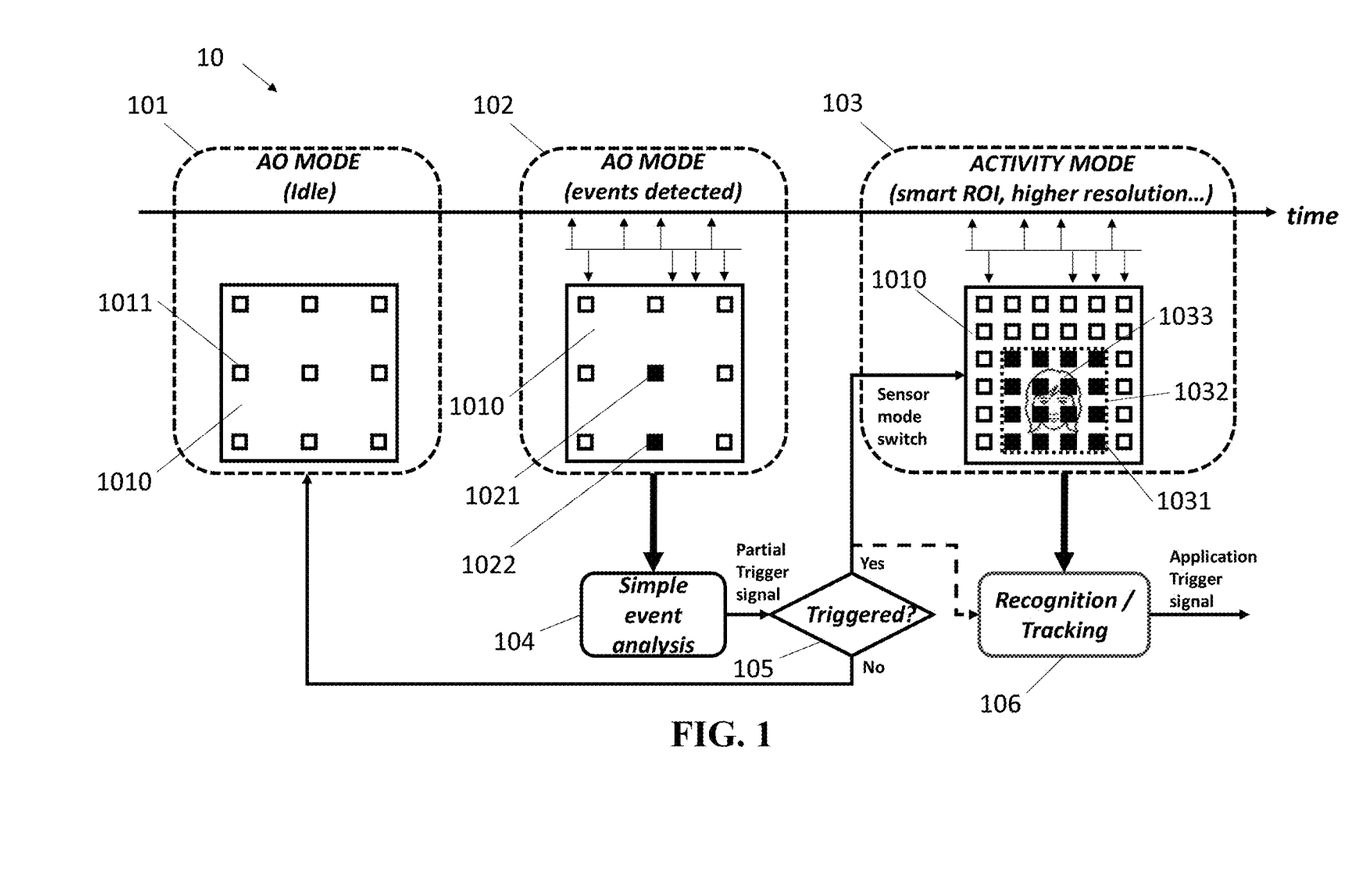
FIG. 1 illustrates a schematic diagram of operating a low-power always-on event-based vision sensor, in accordance with some embodiments of the present disclosure.

FIG. 1 illustrates a schematic diagram 10 of operating a low-power always-on (AO) event-based vision (EVS) sensor, in accordance with some embodiments of the present disclosure.

As shown in block 101, the low-power AO EVS in an AO mode is idle. The EVS sensor pixel array 1010 includes multiple AO pixels 1011. In block 102, AO pixel 1021 and AO pixel 1022 of the AO pixels of the event-based vision sensor pixel array 1010 detect events (e.g., impulses shown in block 102), and then, in block 104, the detected events go through a simple event analysis so as to generate a partial trigger signal. As shown in decision box 105, it is determined whether the detected events meets a predetermined condition. If the detected events meet the predetermined condition, the activity mode of the low-power AO EVS is triggered. Block 103 shows the activity mode of the low-power AO EVS. In the activity mode of the low-power AO EVS, multiple major pixels 1031 of the EVS sensor pixel array 1010 are activated. If the detected events do not meet the predefined threshold, the low-power AO EVS switches back to be idle. In some embodiments of the present disclosure, major pixels 1031 within a specific region-of-interest 1032 of the EVS sensor pixel array 1010 are activated. In some embodiments of the present disclosure, the region-of-interest 1032 is the region where an object 1033 (e.g., user's face) appears. In some embodiments of the present disclosure, the location and/or size of the region-of-interest 1032 is determined according to the locations of the AO pixels that detect events in the AO mode. In some embodiments of the present disclosure, the activated major pixels 1031 in the activity mode have a higher resolution than the AO pixels in the AO mode. In block 106, the detected object 1033 is recognized and tracked, and then an application trigger signal is generated to activate appropriate applications or functions to further process the detected object 1033.

Figure 2:
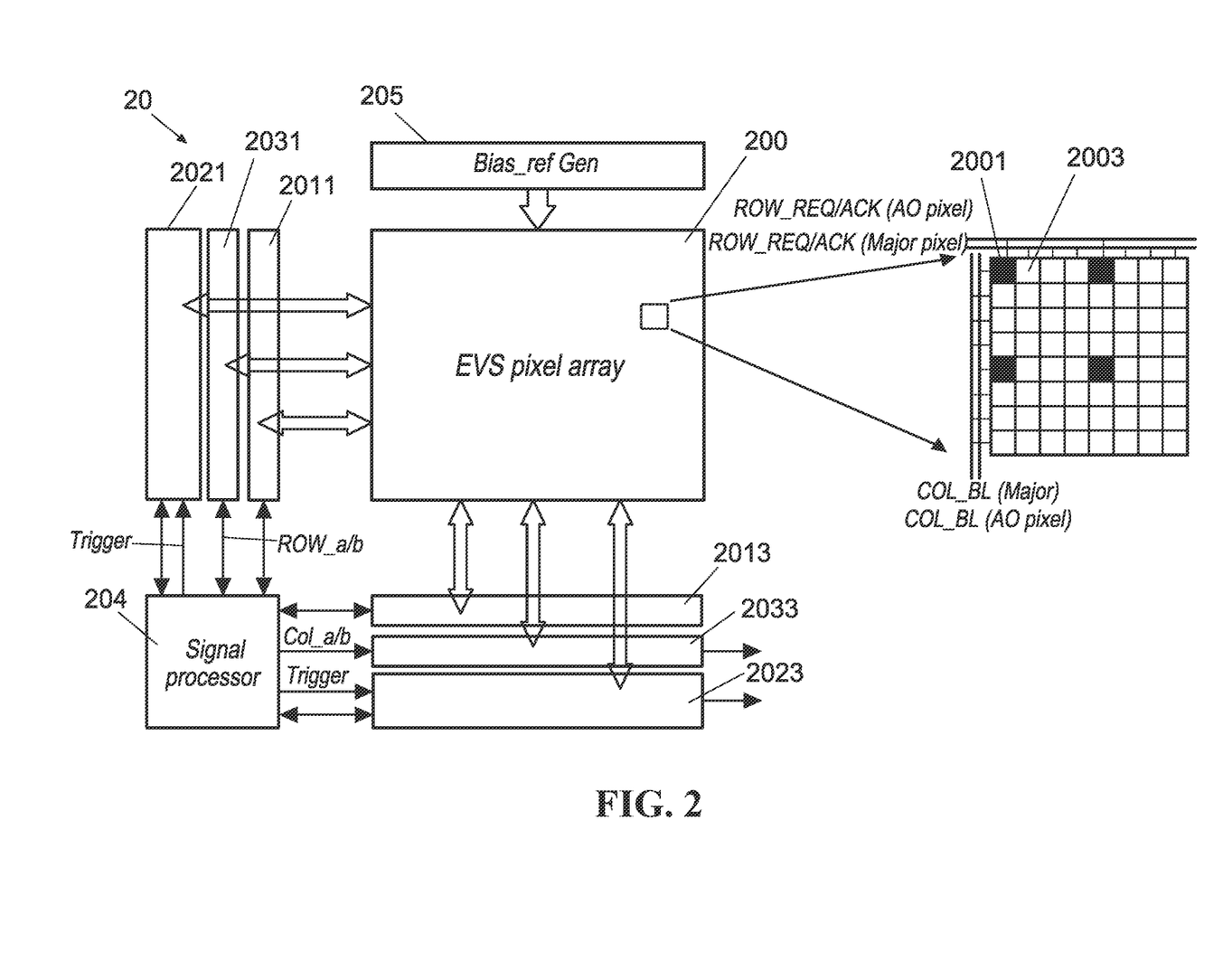
FIG. 2 illustrates a schematic diagram of a low-power always-on event-based vision sensor, in accordance with some embodiments of the present disclosure.

FIG. 2 illustrates a schematic diagram of a low-power always-on event-based vision sensor 20, in accordance with some embodiments of the present disclosure.

In some embodiments of the present disclosure, an event-based vision sensor 20 is provided. The event-based vision sensor 20 comprises an event-based vision sensor pixel array 200, an always-on row scanner 2011, an always-on column scanner 2013, a major row scanner 2021 and a major column scanner 2023. The event-based vision sensor pixel array 200 comprises a plurality of always-on pixels 2001 and a plurality of major pixels 2003. The always-on row scanner 2011 and the always-on column scanner 2013 are for the plurality of always-on pixels 2001. The major row scanner 2021 and the major column scanner 2023 are for the plurality of major pixels 2003. In some embodiments of the present disclosure, the always-on row scanner 2011 and the major row scanner 2021 can be combined into a single row scanner. In some embodiments of the present disclosure, the always-on column scanner 2013 and the major column scanner 2023 can be combined into a single column scanner.

When the event-based vision sensor 20 is configured to be operated in an always-on mode, the plurality of major pixels 2003 are powered down, and the plurality of always-on pixels 2001, the always-on row scanner 2011 and the always-on column scanner 2013 are in operation. In some embodiments of the present disclosure, the event-based vision sensor 20 further comprises a bias reference generator 205 for providing bias voltage for the event-based vision sensor pixel array 200.

In some embodiments of the present disclosure, when the event-based vision sensor 20 is configured to be operated in the always-on mode as shown in FIG. 1, the major row scanner 2021 and the major column scanner 2023 are powered down. In some embodiments of the present disclosure, when the event-based vision sensor 20 is configured to be operated in an activity mode as shown in FIG. 1, at least part of the plurality of major pixels 2003 are turned on and the major row scanner 2021 and the major column scanner 2023 are also turned on. In some embodiments of the present disclosure, there can be various types of operation modes similar to the activity mode as needed. For example, in a full-pixel mode, all of the plurality of major pixels 2003 can be turned on.

In some embodiments of the present disclosure, the event-based vision sensor 20 further comprises a region-of-interest (ROI) control for controlling the power of the plurality of major pixels. In some embodiments of the present disclosure, the at least part of the plurality of major pixels 2003 are turned on based on the region-of-interest control. In some embodiments of the present disclosure, the region-of-interest control comprises a row ROI control 2031 and a column ROI control 2033.

In some embodiments of the present disclosure, the event-based vision sensor 20 further comprises a signal processor 204. When the event-based vision sensor 20 switches to the activity mode as shown in FIG. 1, the signal processor 204 generates a valid trigger signal Trigger to the major row scanner 2021 and the major column scanner 2023. In some embodiments of the present disclosure, when the event-based vision sensor 20 switches to the activity mode as shown in FIG. 1, the signal processor 204 generates a valid row address Row_a/b and a valid column address Col_a/b to the region-of-interest control to indicate the at least part of the plurality of major pixels 2003 to be turned on.

In some embodiments of the present disclosure, the EVSs are overlaid with any arbitrary color filter array (CFA). In some embodiments of the present disclosure, an image sensing apparatus comprises a hybrid pixel array comprising a plurality of always-on event-based vision sensor pixels and a plurality of CMOS image sensor (CIS) pixels. Such image sensing apparatus further comprises an always-on row scanner, an always-on column scanner, a CIS row scanner and a CIS column scanner. The always-on row scanner and the always-on column scanner are for the plurality of always-on pixels, and the CIS row scanner and the CIS column scanner are for the plurality of CIS pixels.

In some embodiments of the present disclosure, when the image sensing apparatus is configured to be operated in an always-on mode, the plurality of CIS pixels are powered down, and the plurality of always-on event-based vision sensor pixels, the always-on row scanner and the always-on column scanner are in operation. In some embodiments of the present disclosure, when the image sensing apparatus is configured to be operated in the always-on mode, the CIS row scanner and the CIS column scanner are powered down. In some embodiments of the present disclosure, when the image sensing apparatus is configured to be operated in an activity mode, at least part of the plurality of CIS pixels are turned on and the CIS row scanner and the CIS column scanner are also turned on.

In some embodiments of the present disclosure, the image sensing apparatus further comprises a region-of-interest (ROI) control controlling the power of the plurality of CIS pixels. In some embodiments of the present disclosure, the at least part of the plurality of CIS pixels are turned on based on the region-of-interest control. In some embodiments of the present disclosure, the region-of-interest control comprises a row ROI control and a column ROI control.

Instead of turning on the major pixels 2003 of the event-based vision sensor pixel array 200 in FIG. 2 when the event-based vision sensor 20 is configured to be operated in an activity mode as shown in FIG. 1, the plurality of CIS pixels are turned on when the image sensing apparatus is configured to be operated in an activity mode.

Figure 3:
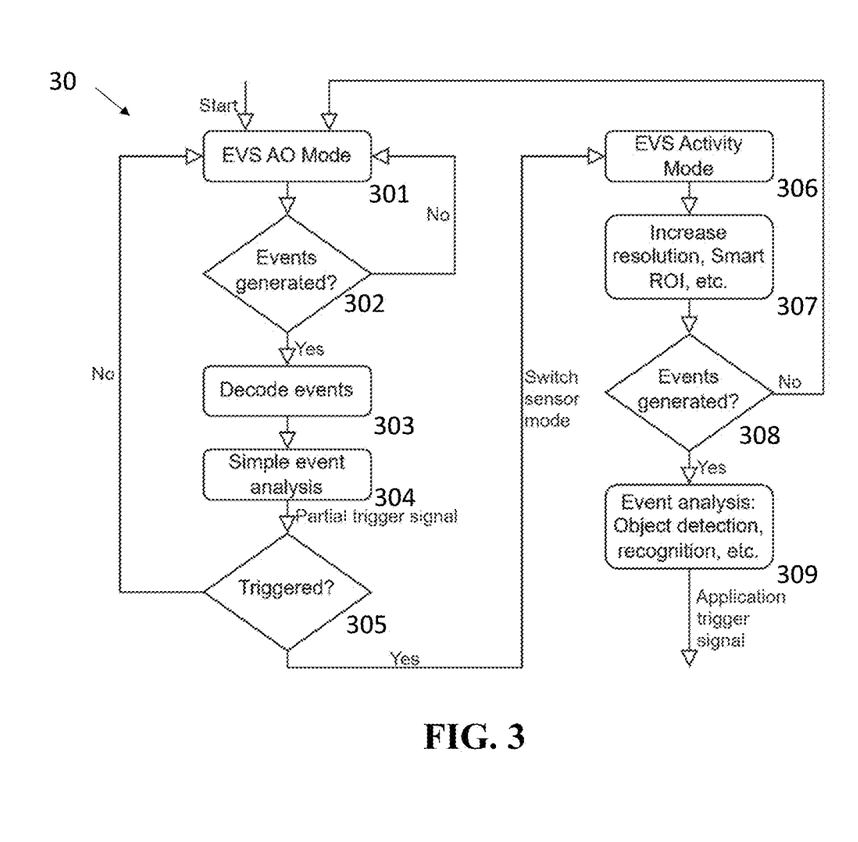
FIG. 3 is a flow chart of a method for operating an event-based vision sensor, in accordance with some embodiments of the present disclosure.

FIG. 3 is a flow chart of a method 30 for operating an event-based vision sensor, in accordance with some embodiments of the present disclosure.

In some embodiments of the present disclosure, a method 30 for operating an event-based vision sensor 20 as shown in FIG. 2 is provided. The event-based vision sensor 20 comprises an event-based vision sensor pixel array 200 as shown in FIG. 2. The event-based vision sensor pixel array 200 comprises a plurality of always-on pixels 2001 and a plurality of major pixels 2003. In some embodiments of the present disclosure, the event-based vision sensor 20 further comprises a ROI control for controlling the power of the plurality of major pixels 2003.

The method 30 comprises: when the event-based vision sensor 20 is in an AO mode as shown in block 301, receiving, by the signal processor 204, first events detected by the plurality of always-on pixels to check whether events are generated in decision box 302. If it is determined that events are not generated in decision box 302, the event-based vision sensor goes back to be idle in an AO mode as shown in block 301. If it is determined that events are generated in decision box 302, the events are decoded by the signal processor in block 302 and gone through a simple event analysis in block 304 to determine whether the received events meet a predefined threshold. In some embodiments of the present disclosure, the event-based vision sensor 20 further comprises a decoder to decode the events before the events are received by the signal processor 204. In some embodiments of the present disclosure, the event data of the first events is Raw data, and the event data of the decoded first events is text data or human readable data. A partial trigger signal is generated by the signal processor 204. In decision box 305, in response to determining the received first events meet the first predefined threshold, generating, by the signal processor 204, a valid trigger signal to turn on at least part of the plurality of major pixels 2003 and switching the event-based vision sensor 20 to be in an activity mode as shown in block 306.

When the event-based vision sensor 20 is in the activity mode as shown in block 306, the resolution of the event-based vision sensor pixel array 200 may then be increased or a smart ROI control function may be triggered in block 307. In some embodiments of the present disclosure, the at least part of the plurality of major pixels are turned on based on the ROI control. Then, events detected by the at least part of the plurality of major pixels 2003 are received by the signal processor 204 to determine in decision box 308 whether the received events meet a predefined threshold. If it is determined that the received events fail to meet the predefined threshold, an invalid trigger signal to power down the at least part of the plurality of major pixels 2003 and switching the event-based vision sensor 20 to be in the AO mode in block 301. However, if it is determined that the received events meet the predefined threshold, the signal processor 204 analyzes the events in block 309 by object detection, object recognition, etc. In some embodiments of the present disclosure, analyzing the second events comprises analyzing shapes, detecting one or more objects or recognizing a human face. In some embodiments of the present disclosure, in response to analyzing the second events, the events are further processed for data fusion, tracking or three-dimensional reconstruction.

In some embodiments of the present disclosure, after block 307, the invalid trigger signal may be triggered by receiving a user input (e.g., pressing a power button) to power down the at least part of the plurality of major pixels 2003 and switching the event-based vision sensor 20 to be in the AO mode in block 301.

In some embodiments of the present disclosure, when switching the event-based vision sensor 20 to the activity mode, the signal processor 204 generates a valid row address Row_a/b and a valid column address Col_a/b to the ROI control to indicate the at least part of the plurality of major pixels 2003 to be turned on.

The present disclosure relates to an EVS and its operation modes for coarse-grained and fine-grained detection. The EVS pixel array is divided into two types of pixels: AO pixels and major pixels. These pixels are connected to separate row and column buses, which are controlled by individual row and column scanners.

The separation of row and column scanners serves to reduce the design complexity and power consumption of the scanner in AO mode. In the AO mode, only the AO pixels and their corresponding row/column scanners are active for coarse-grained detection. The major pixels and their row/column scanners are powered-down.

For activity mode, a portion of the major pixels are selectively turned on based on external ROI control. The major row and column scanners are also activated accordingly. The power supply to the major pixels is controlled by the row and column ROI control.

In the AO mode, all major pixels are powered-down, and only the major pixels with valid Row_ROI and Col_ROI are turned on for fine-grained detection in activity mode. When switching to activity mode, the signal processor issues a valid Trigger signal to the major row and column scanners. Additionally, it provides valid row and column addresses (Row_a/b and Col_a/b) to the ROI control, indicating the major pixels to be turned on.

This configuration allows for efficient power management and selective activation of pixels based on the desired detection mode. The EVS can operate in AO mode for coarse-grained detection, where only AO pixels are active. In activity mode, the EVS can selectively activate major pixels based on external ROI control, enabling fine-grained detection.

The present disclosure provides a novel approach to optimize power consumption and design complexity in event-based vision sensors. By dividing the pixel array into AO and major pixels and controlling their activation through separate row and column scanners, the EVS can efficiently perform both coarse-grained and fine-grained detection tasks.

In conclusion, the event-based vision sensor described herein offers improved power management and reduced design complexity through the separation of AO and major pixels, as well as their corresponding row and column scanners. The ability to selectively activate pixels based on external ROI control allows for both coarse-grained and fine-grained detection, making the EVS a versatile and efficient sensor for various applications.

In some embodiments of the present disclosure, the row scanners of the AO and major pixels can be unified and the column scanners of the AO and major pixels can be unified so as to save chip area.

Figure 4:
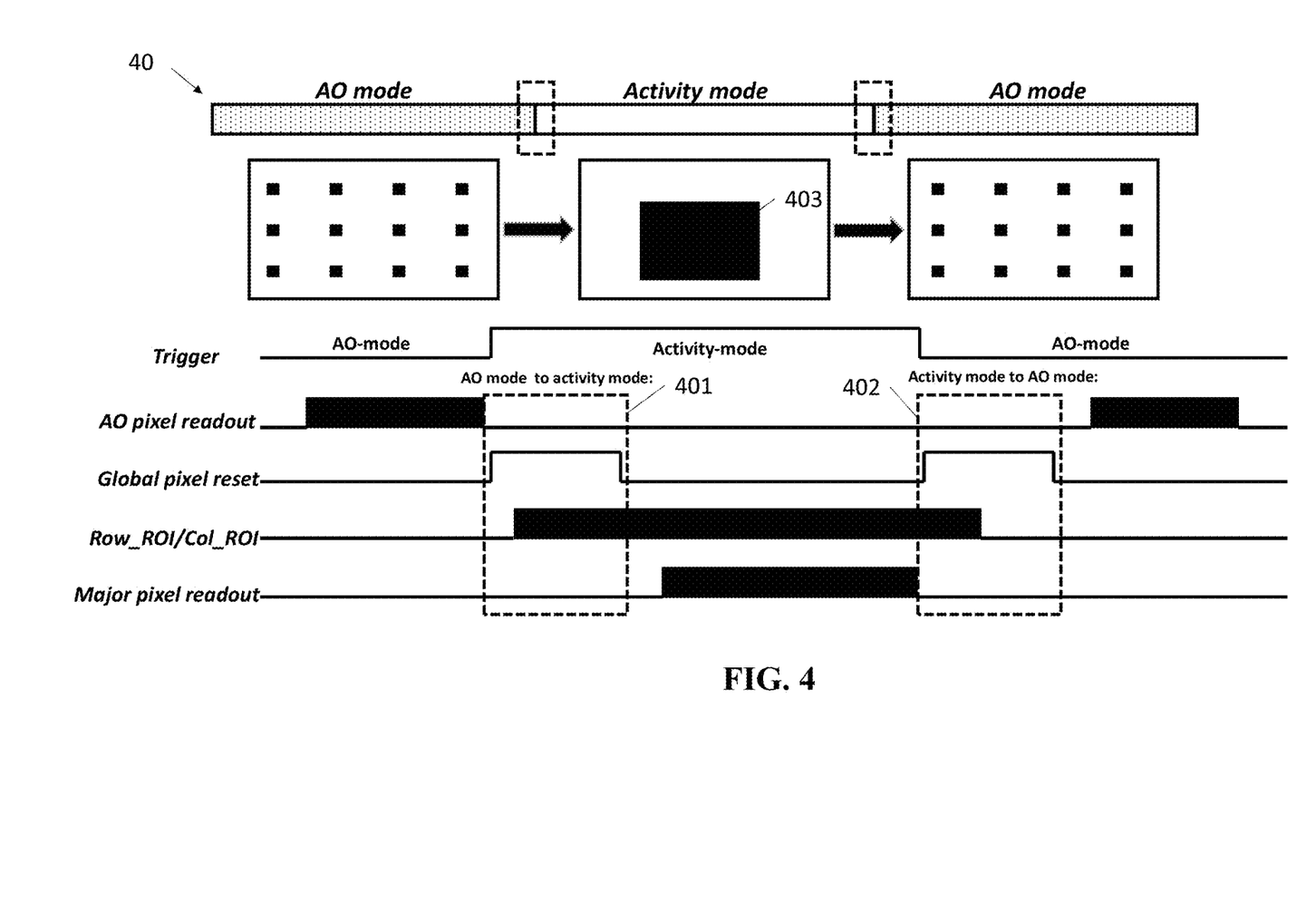
FIG. 4 illustrates a time diagram of operating a low-power always-on event-based vision sensor, in accordance with some embodiments of the present disclosure.

FIG. 4 illustrates a time diagram 40 of operating a low-power always-on event-based vision sensor, in accordance with some embodiments of the present disclosure.

Time diagram 40 further shows the details of switching an event-based vision sensor between the AO mode and the activity mode. As shown in FIG. 4, in some embodiments of the present disclosure, the signal Trigger is low when in the AO mode and is high in the activity mode. The signal Trigger powers up the at least part of the plurality of major pixels 2003. In some embodiments of the present disclosure, the signal AO pixel readout shows that events are read by the AO pixels 2001 in the AO mode. The dashed box 401 marks the switching from the AO mode to the activity mode. Regarding the signal Global pixel reset, as shown in FIG. 4, the signal Global pixel rest becomes high during the switching so as to stop the AO pixels 2001 from readout and reset all the pixels in the event-based vision sensor pixel array 200. After the pixels are reset, the signal Row_ROI/Col_ROI shows how the ROI control controls the plurality of major pixels 2003 and activates the ROI 403. The signal Major pixel readout shows that events are read by the major pixels 2003 in the activity mode. The dashed box 402 marks the switching from the activity mode to the AO mode. The signal Global pixel reset becomes high again during the switching so as to stop the major pixels 2003 from readout and reset all the pixels in the event-based vision sensor pixel array 200.

Event-based vision sensors are a type of sensor that offer several unique features and capabilities. One of the key advantages of these sensors is their ability to operate in a low-power always-on mode, which consumes approximately 100 times less power compared to the state-of-the-art CIS-based methods.

Event-based vision sensors are designed to have at least two operation modes: always-on (AO) mode and activity mode. The AO mode is a low-power mode that allows the sensor to be continuously operational while consuming minimal power. On the other hand, the activity mode is a performance mode that provides enhanced capabilities and higher performance but consumes more power.

To enable the AO mode, additional hardware logic is incorporated into the sensor. Such hardware logic allows for the selection of AO pixels or regions of interest (ROIs). By selectively activating only specific pixels or ROIs, the sensor can significantly reduce power consumption while still capturing relevant events.

The data captured by the sensor is stored into a buffer. The buffer acts as a temporary storage space for the captured data before it is further processed. The data may undergo additional decoding to extract relevant information or features.

Once the data is available, it is analyzed by a trigger algorithm block. This trigger algorithm block can be implemented either in hardware or software, depending on the specific implementation. The trigger algorithm block analyzes the data and identifies specific events or patterns of interest.

Based on the analysis performed by the trigger algorithm block, one or several trigger signals are generated. These trigger signals can be used to switch the sensor's operation mode, transitioning it from the low-power AO mode to the higher performance activity mode. Additionally, the trigger signals can also wake up other processes or components that are connected to the sensor.

In summary, the event-based vision sensor described in the present disclosure offers significant advantages in terms of power consumption and operational flexibility. By incorporating an AO mode, additional hardware logic, and trigger algorithm block, the sensor can operate in a low-power always-on mode while still providing high-performance capabilities when required.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An event-based vision sensor, comprising:
   an event-based vision sensor pixel array comprising:
      a plurality of always-on pixels; and
      a plurality of major pixels;
   an always-on row scanner and an always-on column scanner for the plurality of always-on pixels; and
   a major row scanner and a major column scanner for the plurality of major pixels,
   wherein when the event-based vision sensor is configured to be operated in an always-on mode, the plurality of major pixel are powered down, and the plurality of always-on pixels, the always-on row scanner and the always-on column scanner are in operation.

2. The event-based vision sensor according to claim 1, wherein, when the event-based vision sensor is configured to be operated in the always-on mode, the major row scanner and the major column scanner are powered down.

3. The event-based vision sensor according to claim 1, wherein, when the event-based vision sensor is configured to be operated in an activity mode, at least part of the plurality of major pixels are turned on and the major row scanner and the major column scanner are also turned on.

4. The event-based vision sensor according to claim 3, further comprising a region-of-interest control for controlling the power of the plurality of major pixels.

5. The event-based vision sensor according to claim 4, wherein the at least part of the plurality of major pixels are turned on based on the region-of-interest control.

6. The event-based vision sensor according to claim 5, wherein, when the event-based vision sensor switches to the activity mode, the signal processor generates a valid row address and a valid column address to the region-of-interest control to indicate the at least part of the plurality of major pixels to be turned on.

7. The event-based vision sensor according to claim 4, wherein the region-of-interest control comprises a row region-of-interest control and a column region-of-interest control.

8. The event-based vision sensor according to claim 3, further comprising a signal processor, wherein, when the event-based vision sensor switches to the activity mode, the signal processor generates a valid trigger signal to the major row scanner and the major column scanner.

9. An image sensing apparatus, comprising:
   a hybrid pixel array comprising:
      a plurality of always-on event-based vision sensor pixels; and
      a plurality of CMOS image sensor (CIS) pixels
      an always-on row scanner and an always-on column scanner for the plurality of always-on pixels; and
      a CIS row scanner and a CIS column scanner for the plurality of CIS pixels,
   wherein, when the image sensing apparatus is configured to be operated in an always-on mode, the plurality of CIS pixels are powered down and the plurality of always-on event-based vision sensor pixels, the always-on row scanner and the always-on column scanner are in operation.

10. The image sensing apparatus according to claim 9, wherein, when the image sensing apparatus is configured to be operated in the always-on mode, the CIS row scanner and the CIS column scanner are powered down.

11. The image sensing apparatus according to claim 9, wherein, when the image sensing apparatus is configured to be operated in an activity mode, the at least part of the plurality of CIS pixels are turned on and the CIS row scanner and the CIS column scanner are also turned on.

12. The image sensing apparatus according to claim 11, further comprising a region-of-interest control controlling the power of the plurality of CIS pixels.

13. A method for operating an event-based vision sensor comprising an event-based vision sensor pixel array, wherein the event-based vision sensor pixel array comprises a plurality of always-on pixels and a plurality of major pixels, the method comprising:
   when the event-based vision sensor is in an always-on mode:
      receiving, by a signal processor, first events detected by the plurality of always-on pixels;
      determining, by the signal processor, whether the received first events meet a first predefined threshold; and
      in response to determining the received first events meet the first predefined threshold, generating, by the signal processor, a valid trigger signal to turn on at least part of the plurality of major pixels and switching the event-based vision sensor to be in an activity mode.

14. The method according to claim 13, further comprising:
- when the event-based vision sensor is in the activity mode:
  - receiving, by the signal processor, second events detected by the at least part of the plurality of major pixels;
  - determining, by the signal processor, whether the received second events meet a second predefined threshold;
  - in response to determining the received second events meet the second predefined threshold, analyzing, by the signal processor, the second events; and
  - in response to determining the received second events does not meet the second predefined threshold, generating, by the signal processor, an invalid trigger signal to power down the at least part of the plurality of major pixels and switching the event-based vision sensor to be in the always-on mode.

15. The method according to claim 14, wherein analyzing the second events comprises analyzing shapes, detecting one or more objects or recognizing a human face.

16. The method according to claim 13, further comprising a region-of-interest control for controlling the power of the plurality of major pixels.

17. The method according to claim 16, wherein the at least part of the plurality of major pixels are turned on based on the region-of-interest control.

18. The method according to claim 17, further comprising:
- when switching the event-based vision sensor to the activity mode, generating, by the signal processor, a valid row address and a valid column address to the region-of-interest control to indicate the at least part of the plurality of major pixels to be turned on.

19. The method according to claim 13, further comprising:
- decoding, by a decoder, the first events before the first events are received by the signal processor.

20. The method according to claim 19, wherein the event data of the first events is Raw data, and the event data of the decoded first events is human readable data.

* * * * *